Nov. 12, 1957  A. WINTER ET AL  2,812,840
CLUTCH DEVICE
Filed July 6, 1955

Inventors
AUGUST WINTER
HANS BUECHELMAIER,
BY Parry & Grin
ATTORNEYS

United States Patent Office 2,812,840
Patented Nov. 12, 1957

2,812,840

CLUTCH DEVICE

August Winter and Hans Büchelmaier, Friedrichshafen, Germany, assignors to Zahnradfabrik Friedrichshafen, Friedrichshafen am Boden See, Germany Application July 6, 1955, Serial No. 520,320

4 Claims. (Cl. 192—67)

This invention relates to clutches, and more particularly to clutches which utilize trip pins for gear wheel transmissions, especially as found in motor vehicles.

Transmissions of the prior art utilize trip pins set in semi-circular grooves milled in a bushing, wherein the pins are engageable with the hub of a gear wheel for the purpose of locking the gear to a shaft which carries the bushing. Normally, in coupling position, the end of the trip pins protrude beyond the bushing so as to reach into bores of the gear wheel to be coupled. The torque force is thus exerted on the unsupported end of the trip pins causing bending and shearing in some instances. Further, in prior art arrangement, the torque force is transferred to the bushing which carries the pins by means of a lateral shifting of the bushing. Accordingly, the pins may take an oblique position in the bushing grooves in which the pins are located, causing an undue stress on the gear being coupled and resulting in erratic clutching action.

It is an object of the invention to overcome the disadvantages of the prior art as set forth above.

It is a further object of the invention to provide a clutch mechanism utilizing trip pins, which is sturdy, smoothly acting, and free from mechanical trouble.

In accordance with the objects of the invention, there is provided a bushing having grooves which carry the trip pins, the bushing being keyed to the shaft which carries gear wheels with which the pins are intended to engage. The bushing grooves are extended by means of a pair of flanges each being disposed in an annular recess in the respective gears.

Thus, the grooves in each bushing flange are at all times within a gear body. Each gear recess is provided with grooves that can be brought into peripheral register with respective groves in the bushing when the pins are shifted in the direction of the axis of the shaft to engage a gear. By the use of this construction, there is never any unsupported overhang of the pins intermediate the bushing and a gear, and accordingly, no leverage force due to the transfer of torque can be brought to bear on the pins to cause bending or shearing.

A detailed description of the invention will now be given in conjunction with the appended drawing, in which.

Figure 1:
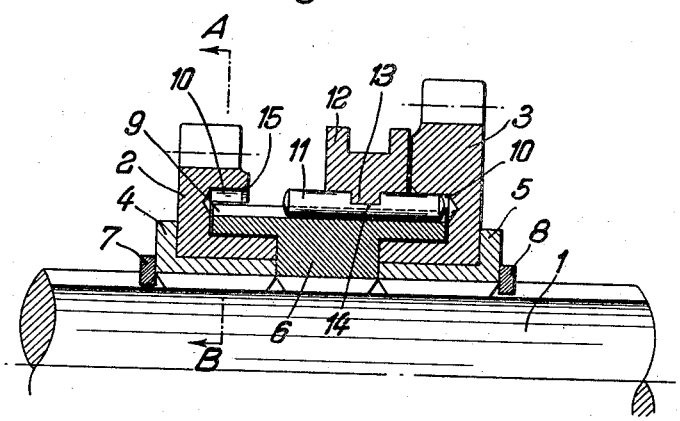
Fig. 1 is a longitudinal cross-section of the mechanism.
Figure 2:
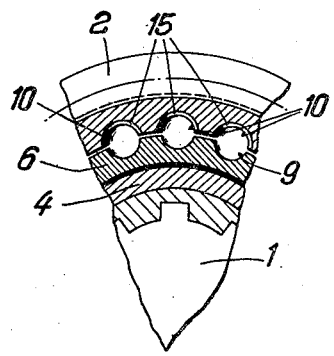
Fig. 2 is a section taken through A—B of Fig. 1.

With reference to the drawing, a shaft 1 is disclosed which carries gears 2 and 3, either of which may be keyed to the shaft for rotation therewith. The gears are rotatively carried on respective collars 4 and 5. Intermediate the gears, a bushing 6 is carried on the shaft and is suitably keyed thereto. Thus, the collars 4 and 5 and bushing 6 rotate with the shaft and assembly is retained as shown in Fig. 1 by means of lock washers such as 7 and 8.

Bushing 6 is provided with a plurality of semi-circular grooves 9 which may be brought into register with semicircular grooves 10 suitably provided on a wall within annular recesses 2', 3' of respective gears when the pins 11 are moved in either direction to lock a particular gear to the bushing 6 and thus to the shaft 1. Thus grooves 9 register with grooves 10 to form substantially complete bores for accommodating pins 11 to lock either gear to the bushing.

For the purpose of actuating the pins in unison, a shifting sleeve 12 is utilized having an internal annular rib 13 which keys with suitably provided notches 14 in each of the pins. Accordingly, it will be understood that shifting of the sleeve 12 will cause all of the pins to move in the direction in which the sleve is shifted—that is, toward either of the gears for the purpose of locking one of the gears to the shaft.

In order to provide for smooth, non-clashing action of the pins in engaging the gears, the semi-circular recesses 10 are provided with bevelled entrances as indicated by reference character 15.

From the foregoing description it will be apparent that owing to the fact that the bushing 6 extends laterally on either side directly into the body of the gears, pins 11 may be transported slidably in their respective recesses 9 directly into either gear. At no point in the movement of pins 11 are they tangentially unsupported; thus, by retention in respective recesses 9 they are continuously given side support by the recesses so that even at the instant in which the pins engage the bevels 15, full lateral support of the pins is afforded until they are ultimately centered in the recesses 10 to lock one or the other gears to the shaft. Since there are no unbalanced tangential torque forces exerted on the pins, "springing" of the pins is completely avoided which would cause erratic action of the mechanism as well as damage to the pins.

The length of bushing 6 relative the length of pins 11 is such that the pins may be centered with respect to the gears so that neither gear is engaged. This will be readily apparent from Fig. 1.

Having thus described our invention, it is believed that various changes may be made without departing from the spirit thereof; accordingly, we do not seek to be limited to the precise illustration herein given except as set forth in the appended claims.

We claim:

1. A trip pin clutch, comprising a bushing having a peripheral surface provided with a plurality of grooves and siladbly carrying a trip pin in each groove, said bushing being mounted on a shaft; a rotary element mounted on said shaft to be coupled to said bushing, said rotary element having a recess in the face thereof opening toward said bushing, said bushing having an annular flange protruding into said annular recess, the grooves in said bushing extending length of said annular flange, said annular recess having a wall provided with grooves for accommodating respective trip pins and means for shifting said pins on said bushing into said recess in engagement with the grooves in said annular wall.

2. A trip pin clutch comprising a bushing, a shaft on which said bushing is keyed, said bushing having an annular flange extending on each side thereof, a plurality of grooves on the surface of said bushing extendng to the end of each annular flange, a pair of gear rotatably carried on said shaft and rotative relative thereto, each of said gears having an annular recess facing a respective annular flange of said bushing and into which a respective annular flange protrudes, means for maintaining said bushing and said gears in substantially fixed axial relationship with each other, said annular recesses being provided with groove means registrable with the grooves in respective bushing flanges, and a plurality of trip pins carried in grooves of said bushing and slidable to the extremity of either of said flanges for engagement with respective groove means of said gears.

3. A trip pin clutch comprising a bushing having a longitudinally extending flange, said flange having a plurality of longitudinally extending grooves, a rotary element to be locked to said bushing for rotation therewith, said rotary element having an annular recess into which the flange protrudes, said recess having a wall provided with grooves registrable with the groves in said flange so as to form substantially complete bores when peripherally registered therewith, and a plurality of slidable pins carried in the grooves of said flange, means for simultaneously sliding said pins into engagement with the grooves of said rotary element to align and register the grooves thereof with the grooves in said flange and thus lock said rotary element to said bushing.

4. A device as set forth in claim 3, wherein the grooves provided in the wall of the recess of said rotary element are formed with bevelled entrances initially engageable by said pins.

References Cited in the file of this patent

UNITED STATES PATENTS

| | | |
|---|---|---|
| 1,646,646 | Gaylord | Oct. 25, 1927 |

FOREIGN PATENTS

| | | |
|---|---|---|
| 437,343 | Great Britain | July 16, 1934 |
| 1,095,514 | France | Dec. 22, 1954 |